United States Patent
Shatsky et al.

(10) Patent No.: US 10,599,580 B2
(45) Date of Patent: Mar. 24, 2020

(54) REPRESENTING AN ADDRESS SPACE OF UNEQUAL GRANULARITY AND ALIGNMENT

(71) Applicant: International Business Machines Corporation, Armonk, NY (US)

(72) Inventors: Yosef Shatsky, Karnei Shomron (IL); Asaf Porat-Stoler, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/987,760

(22) Filed: May 23, 2018

(65) Prior Publication Data
US 2019/0361814 A1     Nov. 28, 2019

(51) Int. Cl.
*G06F 12/10* (2016.01)
*G06F 3/06* (2006.01)

(52) U.S. Cl.
CPC ............ *G06F 12/10* (2013.01); *G06F 3/0604* (2013.01); *G06F 3/067* (2013.01); *G06F 3/0665* (2013.01); *G06F 2212/1008* (2013.01); *G06F 2212/657* (2013.01)

(58) Field of Classification Search
CPC ...... G06F 3/0604; G06F 3/0665; G06F 3/067; G06F 12/10; G06F 2212/1008; G06F 2212/657
See application file for complete search history.

(56) References Cited

U.S. PATENT DOCUMENTS

| | | | | |
|---|---|---|---|---|
| 5,454,091 | A * | 9/1995 | Sites | G06F 12/1027 711/203 |
| 8,819,385 | B2 | 8/2014 | Barsky et al. | |
| 9,223,693 | B2 | 12/2015 | Sinclair et al. | |
| 2004/0215918 | A1 * | 10/2004 | Jacobs | G06F 12/1009 711/207 |
| 2005/0144369 | A1 | 6/2005 | Jaspers | |
| 2011/0047347 | A1 * | 2/2011 | Li | G06F 12/0246 711/209 |
| 2012/0185667 | A1 * | 7/2012 | Gandhi | G06F 12/1009 711/203 |
| 2013/0227236 | A1 * | 8/2013 | Flynn | G11C 16/26 711/165 |
| 2018/0349286 | A1 * | 12/2018 | Rana | G06F 12/1009 |
| 2019/0018788 | A1 * | 1/2019 | Yoshida | G06F 12/1009 |
| 2019/0087323 | A1 * | 3/2019 | Kanno | G06F 12/0246 |

OTHER PUBLICATIONS

Ahn, S. "Data Alignment," 2005, 4 pages Retrieved from http://www.songho.ca/misc/alignment/dataalign.html.
Rentzsch, J., "Data alignment: Straighten up and fly right," IBM developerWorks, Feb. 8, 2005, 16 pages Retrieved from https://www.ibm.com/developerworks/library/pa-dalign/.

* cited by examiner

*Primary Examiner* — Tracy A Warren
(74) *Attorney, Agent, or Firm* — Zilka-Kotab, P.C.

(57) ABSTRACT

A computer-implemented method according to one embodiment includes identifying a data write to a specific position within a virtual address space, determining an entry within a metadata structure that corresponds to the specific position within the virtual address space, and adding state information associated with the data write to the entry within the metadata structure, the state information including a size of the data write within the virtual address space and an alignment of the data write within the virtual address space.

19 Claims, 9 Drawing Sheets

REPRESENTING AN ADDRESS SPACE OF UNEQUAL GRANULARITY AND ALIGNMENT

BACKGROUND

The present invention relates to data storage and random access memory (RAM), and more specifically, this invention relates to management of a virtual address space within a software management layer of a system.

In software systems, address spaces may be used to represent a placement of data. A virtual address space may require a software management layer to keep track of virtual address space usage, physical addresses associated with virtual addresses, etc. However, current management layer implementations may take up a large amount of available metadata storage and may not allow for direct access for virtual address spaces having unequal granularity and alignment.

SUMMARY

A computer-implemented method according to one embodiment includes identifying a data write to a specific position within a virtual address space, determining an entry within a metadata structure that corresponds to the specific position within the virtual address space, and adding state information associated with the data write to the entry within the metadata structure, the state information including a size of the data write within the virtual address space and an alignment of the data write within the virtual address space.

According to another embodiment, a computer program product for representing an address space of unequal granularity and alignment comprises a computer readable storage medium having program instructions embodied therewith, where the computer readable storage medium is not a transitory signal per se, and where the program instructions are executable by a processor to cause the processor to perform a method comprising identifying a data write to a specific position within a virtual address space, utilizing the processor, determining an entry within a metadata structure that corresponds to the specific position within the virtual address space, utilizing the processor, and adding, utilizing the processor, state information associated with the data write to the entry within the metadata structure, the state information including a size of the data write within the virtual address space and an alignment of the data write within the virtual address space.

A system according to another embodiment comprises a processor, and logic integrated with the processor, executable by the processor, or integrated with and executable by the processor, where the logic is configured to identify a data write to a specific position within a virtual address space, determine an entry within a metadata structure that corresponds to the specific position within the virtual address space, and add state information associated with the data write to the entry within the metadata structure, the state information including a size of the data write within the virtual address space and an alignment of the data write within the virtual address space.

Other aspects and embodiments of the present invention will become apparent from the following detailed description, which, when taken in conjunction with the drawings, illustrate by way of example the principles of the invention.

DETAILED DESCRIPTION

Figure 1:
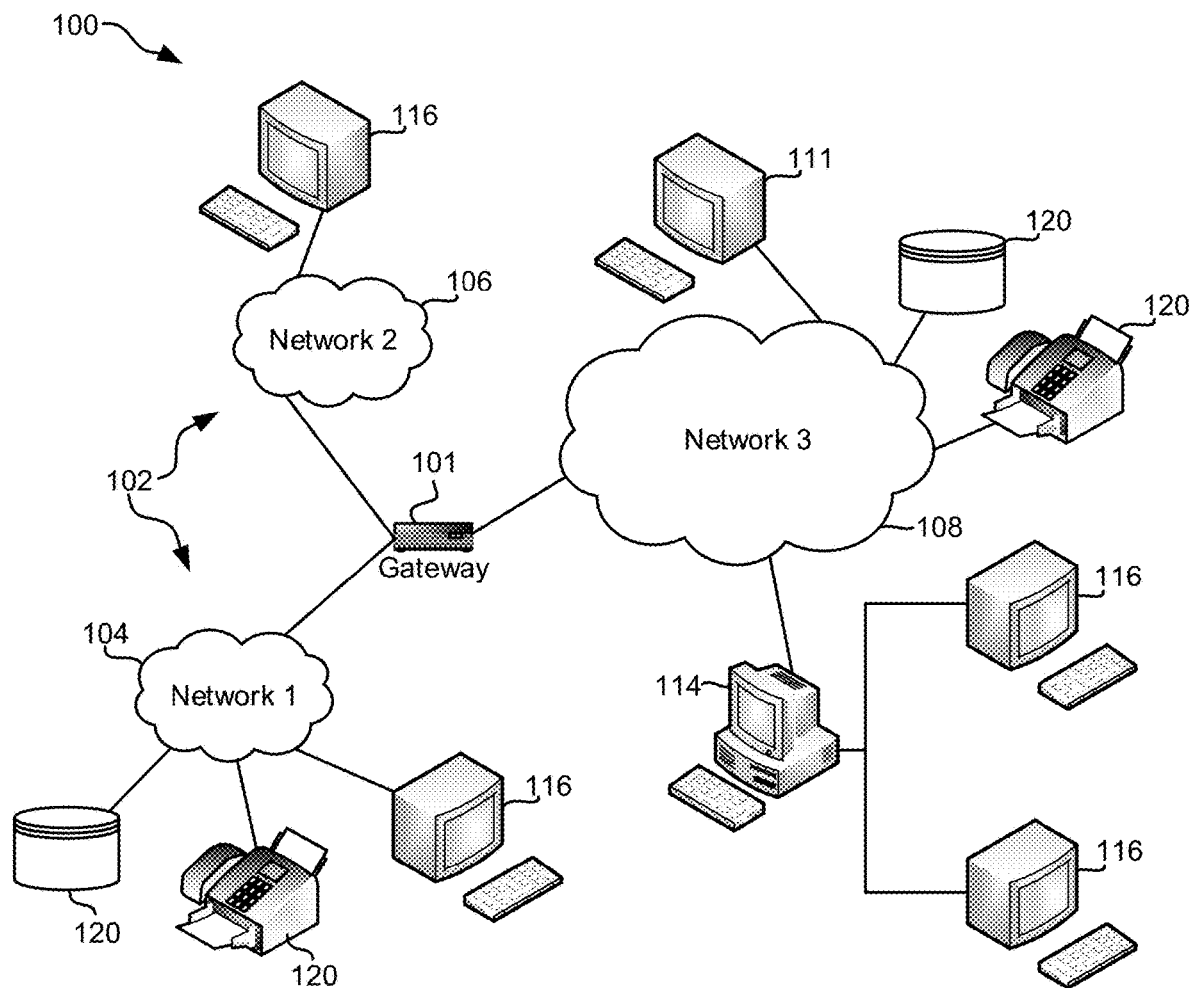
FIG. 1 illustrates a network architecture, in accordance with one embodiment.

The following description discloses several preferred embodiments of systems, methods and computer program products for representing an address space of unequal granularity and alignment. Various embodiments provide a method to identify a data write to a virtual address space, determine a metadata structure entry corresponding to a position of the data write, and add state information associated with the data write to the metadata structure entry.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for representing an address space of unequal granularity and alignment.

In one general embodiment, a computer-implemented method includes identifying a data write to a specific position within a virtual address space, determining an entry within a metadata structure that corresponds to the specific position within the virtual address space, and adding state information associated with the data write to the entry within the metadata structure, the state information including a size of the data write within the virtual address space and an alignment of the data write within the virtual address space.

In another general embodiment, a computer program product for representing an address space of unequal granularity and alignment comprises a computer readable storage medium having program instructions embodied therewith, where the computer readable storage medium is not a transitory signal per se, and where the program instructions are executable by a processor to cause the processor to perform a method comprising identifying a data write to a specific position within a virtual address space, utilizing the processor, determining an entry within a metadata structure that corresponds to the specific position within the virtual address space, utilizing the processor, and adding, utilizing the processor, state information associated with the data write to the entry within the metadata structure, the state information including a size of the data write within the virtual address space and an alignment of the data write within the virtual address space.

In another general embodiment, a system comprises a processor, and logic integrated with the processor, executable by the processor, or integrated with and executable by the processor, where the logic is configured to identify a data write to a specific position within a virtual address space, determine an entry within a metadata structure that corresponds to the specific position within the virtual address space, and add state information associated with the data write to the entry within the metadata structure, the state information including a size of the data write within the virtual address space and an alignment of the data write within the virtual address space.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
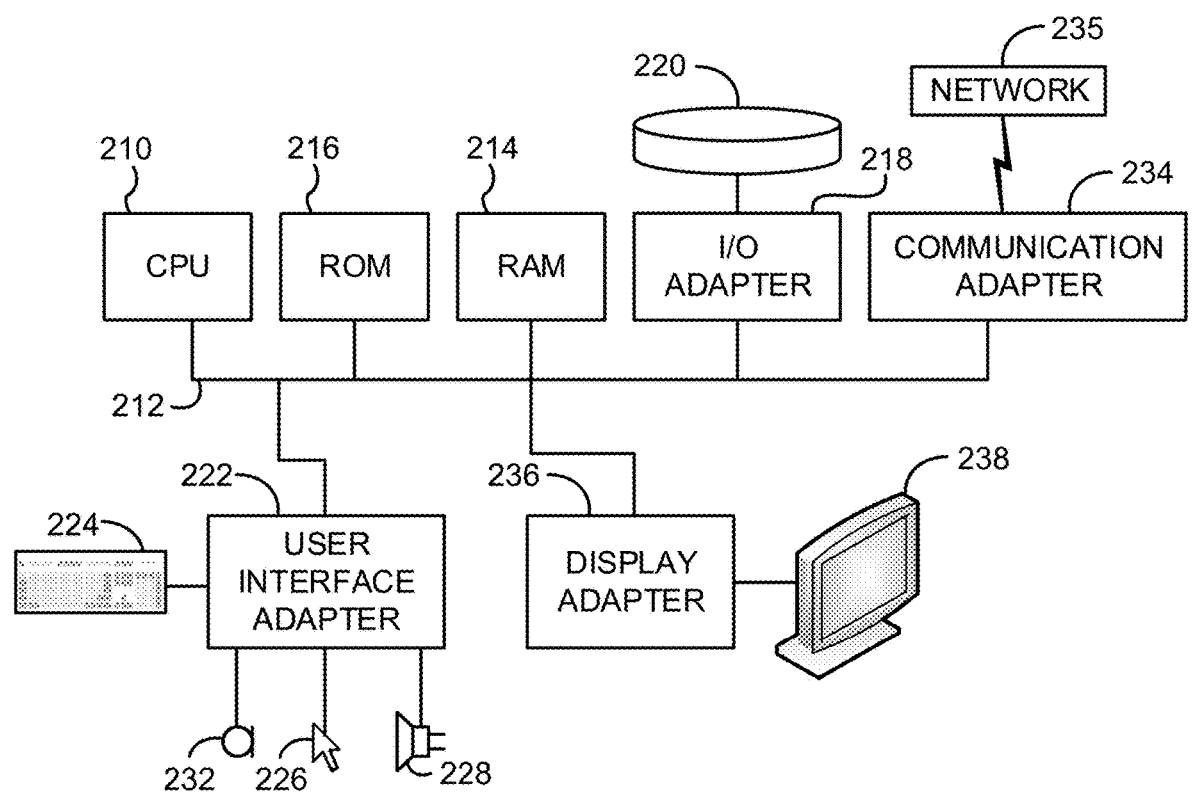
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
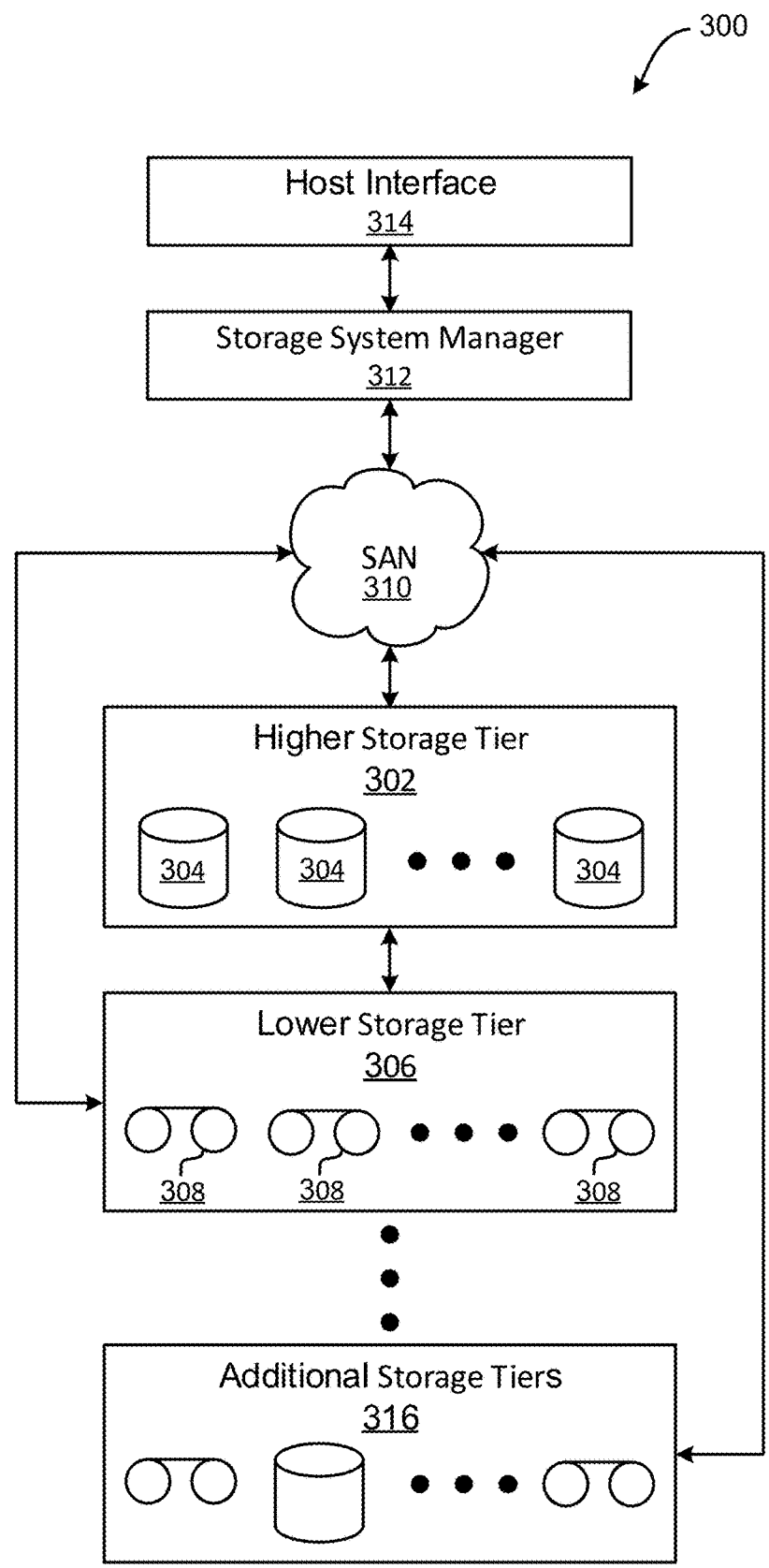
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Figure 4:
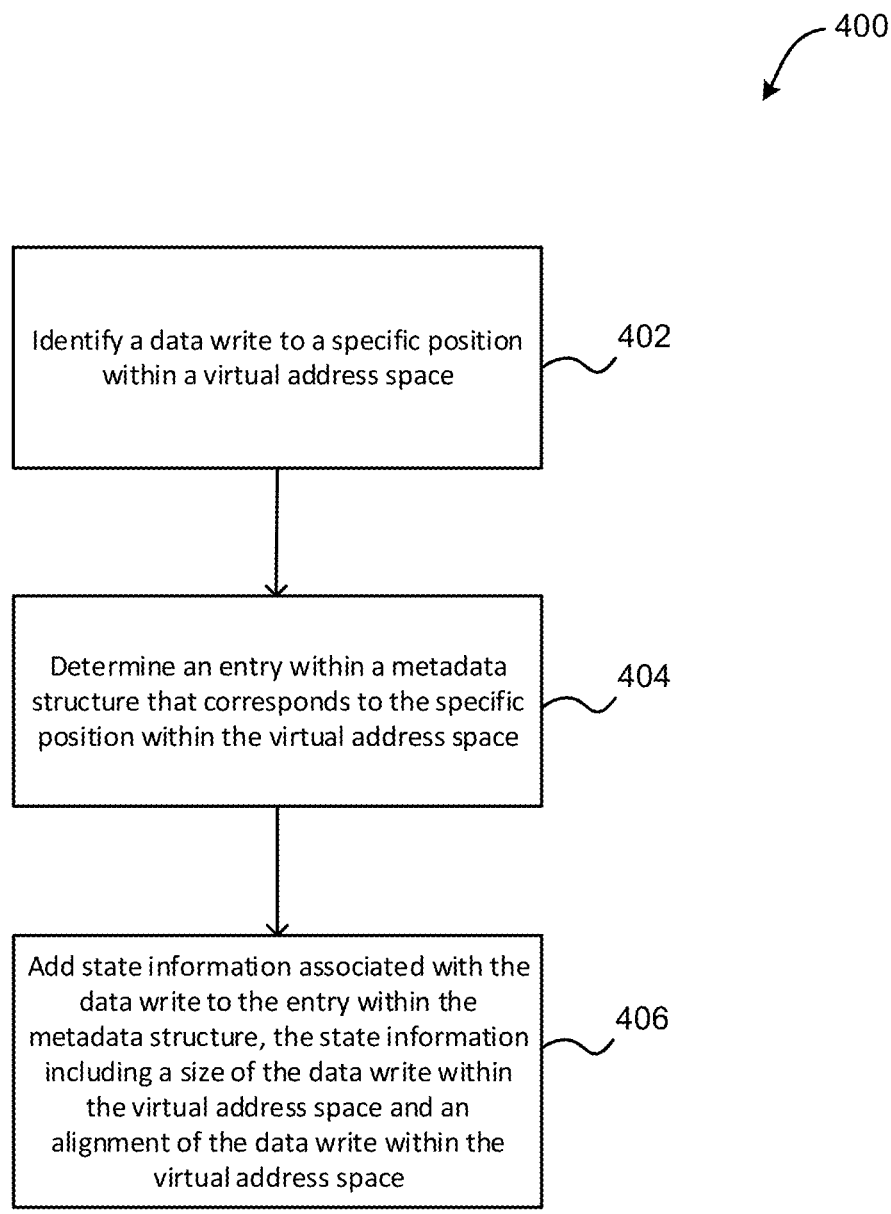
FIG. 4 illustrates a method for representing an address space of unequal granularity and alignment, in accordance with one embodiment.

Now referring to FIG. 4, a flowchart of a method 400 is shown according to one embodiment. The method 400 may be performed in accordance with the present invention in any of the environments depicted in FIGS. 1-3, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where a data write to a specific position within a virtual address space is identified. In one embodiment, the data write may include the writing of data to the specific position within the virtual address space. For example, a user or application may write a portion of data having a predetermined size (e.g., an 8 KB portion of data, etc.) to storage space at a predetermined location/offset (e.g., at an offset of 16 KB within the storage space, etc.).

Additionally, in one embodiment, the data write may be performed by a user, by an application, etc. In another embodiment, the virtual address space may include a range of addresses that correspond to a virtual storage space. For example, the virtual storage space may include a portion of a virtual data drive. In this way, the virtual address space may represent locations within virtual memory where data is stored.

Further, in one embodiment, the virtual address space may be assigned to one or more of a user, an application, etc. In another embodiment, the virtual address space may be assigned by an operating system of a system (e.g., a computing device such as a server, etc.). In yet another embodiment, the virtual address space may have an alignment granularity.

For example, reads and writes within the virtual address space are made according to the alignment granularity. In another example, all data stored within the storage space may have a starting point within the virtual address space that is a multiple of the alignment granularity. In yet another example, if the alignment granularity is 4 KB, data stored within the storage space may have a starting point of 0 KB, 4 KB, 8 KB, 12 KB, 16 KB, etc. within the virtual address space.

Further still, in one embodiment, the virtual address space may have a size granularity. For example, the size granularity may indicate a size of reads and writes that are made to the storage space. In another example, all data read or written to the storage space may have a size that is a multiple of the size granularity. In yet another example, if the size granularity is 8 KB, data stored within the storage space may have a size of 8 KB, 16 KB, 24 KB, etc. Of course, however, other sizes are supported but may require a read to align the write.

Also, in one embodiment, the size granularity may be twice the alignment granularity. For example, the size granularity may be 8 KB, and the alignment granularity may be 4 KB. This may result in an address space of unequal granularity and alignment.

In addition, method 400 may proceed with operation 404, where an entry within a metadata structure that corresponds to the specific position within the virtual address space is determined. In one embodiment, the metadata structure may represent the virtual address space at a management layer of a system. For example, the virtual address space may refer to locations within a storage layer of a system. In another example, the metadata structure may be incorporated within a software management layer of a system. In another embodiment, the metadata structure may link the virtual address space to a physical address space. For example, each entry within the metadata structure may link a virtual address space of a data write to a physical address space where the data associated with the write is physically located. In yet another embodiment, the metadata structure may also contain additional metadata about the data associated with the write, one or more pointers to other metadata structures that contain information about the data associated with the write, etc.

Furthermore, in one embodiment, the metadata structure may include an array. In another embodiment, the metadata structure may allow for direct access to the data in the virtual storage space from the management layer. In yet another embodiment, the metadata structure may be stored separately from the data.

Further still, in one embodiment, the metadata structure may include a plurality of entries. For example, one or more entries within the metadata structure may each correspond to a position within the virtual address space where data is stored. In another example, each entry within the metadata structure may correspond to a grain of the address space (e.g., a portion of the virtual address space having a size matching the size granularity of the virtual address space, etc.).

For instance, if the address space has a size granularity of 8 KB, each entry within the metadata structure may correspond to 8 KB within the address space. In this way, the address space may correspond to a size granularity of the virtual address space.

Also, in one embodiment, each entry within the metadata structure may include an indication as to whether the corresponding grain is in use, a physical address of the grain, etc. In another embodiment, the metadata structure may have a fixed number of entries. In yet another embodiment, each entry may include an entry index number (e.g., an integer, etc.) within the metadata structure.

Additionally, in one embodiment, the entry within the metadata structure may be determined utilizing one or more equations. For example, for a size/alignment granularity with a factor of 2 (e.g., an alignment granularity of X and a size granularity of 2X), and for a specific position pos within the virtual address space, the entry index number i may be found as follows: i=rounddown((pos+0.5X)/(1.5X)). More specifically, with an alignment granularity of 4 KB, and a specific position pos within the virtual address space, the entry index number i may be found as follows: i=rounddown((pos+2 KB)/6 KB), where "rounddown" rounds down to the nearest integer. In another example, if an 8 KB portion of data is written to the storage space at a location of 16 KB within the virtual address space, the entry index number may be: rounddown (16 KB+2 KB)/6 KB)=3. In another embodiment, when reading the data, two positions may be checked where the two cell indices of the positions may be calculated as follows: Entry 1=(pos−2 KB)/6 KB, and Entry 2=(pos+2 KB)/6 KB.

Further, method 400 may proceed with operation 406, where state information associated with the data write is added to the entry within the metadata structure, the state information including a size of the data write within the virtual address space and an alignment of the data write within the virtual address space. In one embodiment, metadata describing the data write may be added to the entry. In another embodiment, a location of the data write may be added to the entry. For example, the location of the data write may include a location in a physical address space where the data is written.

Further still, in one embodiment, the state information may be added as two bits within the entry in the metadata structure. For example, the two bits may indicate a size of the entry, and whether the entry is aligned left or right within the portion of virtual address space represented by the entry within the metadata structure. In another embodiment, the state information may be adjusted to account for a numbering of the entry within the metadata structure.

Also, in one embodiment, the size and the alignment of the data write may be associated with a numbering of the entry. For example, an entry having an odd entry number may have four possible odd entry states, and an entry having an even entry number may have three possible even entry states different from the four possible odd entry states. In another example, the state information stored within an entry may reflect the numbering of the entry, and may be analyzed in association with the numbering of the entry in order to determine the size and the alignment of the data write within the virtual address space.

In addition, in one embodiment, the alignment may include a left alignment or a right alignment. For example, the left alignment may include a lower address the entry may contain. In another example, the right alignment may include a higher address the entry may contain. In yet another example, a difference between the left alignment and the right alignment may be the alignment granularity (e.g., 4 KB, etc.).

Furthermore, in one embodiment, one or more additional entries may be adjusted within the metadata structure, based on the data write. For example, a state of one or more neighbor entries to the determined entry may be identified. In another example, if the data write affects an address space represented by a neighbor entry, the neighbor entry may be modified within the metadata structure. For instance, if the data write affects a previous alignment within the virtual address space, a plurality of entries may be modified within the metadata structure.

Further still, in one embodiment, the metadata structure may be subdivided into a plurality of self-contained groups. In another embodiment, each self-contained group may not have any entry carryover into adjacent groups (e.g., all entries within the self-contained group may start and end within the self-contained group). This may improve a paging performance of the metadata structure, such that the metadata structure may be simply divided into one or more pages.

Also, in one embodiment, the entry within the metadata structure may be used to identify the specific position within the virtual address space, and to translate the specific position within the virtual address space to a location within a physical address space (e.g., of physical storage, etc.) where data is stored. The entry within the metadata structure may also be used to identify and translate a location within a physical address space (e.g., of physical storage, etc.) where data is stored to a corresponding specific position within the virtual address space.

For example, a request may be received at the management layer of the system, where the request indicates a specific position within a physical address space. In response to the request, an entry within the metadata structure that contains the specific position within the physical address space may be located. Additionally, a specific position within the virtual address space may be determined, based on the information stored within the entry, where the information includes the state information.

In this way, the metadata structure may be used to access data within the virtual address space as well as the physical address space, as well as to link a virtual data location within the virtual address space to a physical data location within the physical address space. Also, the metadata structure may be used to manage both the virtual address space as well as the physical address space. For example, entries within the metadata structure may be used to determine whether corresponding virtual address space locations are in use, as well to determine physical storage locations that correspond to virtual address space locations. This may enable both virtual and physical data management within the system, utilizing the metadata structure.

Additionally, a number of entries within the metadata structure that are needed to represent an address space of unequal granularity and alignment within a management layer of a system may be reduced. For example, if the size granularity of the virtual address space is 8 KB, and the alignment granularity of the virtual address space is 4 KB, an average number of entries per 12 KB of address space may be reduced from three to two when compared to solutions that have entries corresponding to an alignment granularity of the virtual address space.

More specifically, by incorporating state information into entries within the metadata structure, each entry within the metadata structure may correspond to a size granularity of the address space, instead of an alignment granularity of the address space. As a result, half as many entries may be needed within the metadata structure (when compared to entries corresponding to an alignment granularity) when the size granularity of the address space is twice the size of the alignment granularity of the address space.

This may also decrease a size of the metadata structure stored within a management layer of a system, which may increase an amount of available storage space within the system, which may in turn increase a performance of the system (e.g., since the additional available storage space may be used for other management duties, etc.). Additionally, a size of the metadata structure may be static for a predetermined address space. This may eliminate a need for one or more allocations associated with the metadata structure.

A Method for Representing an Address Space of Unequal Granularity and Alignment

Introduction

In software systems, address spaces may be used to represent a placement of data. This may be used for RAM allocated to a process, the disk space of a file system, the allocated space of a volume, etc.

In one embodiment, the address space may have a minimal grain size. For example, the grain in a block device may be 512 bytes, and a grain size of a flash drive may be 4 KB. The address space may also be virtual, such as with virtual RAM or space efficient block storage. A virtual address space may require a software management layer that contains an entry per grain of address space. The entry may contain information such as an indication as to whether the grain is in use, a physical address of the grain, etc.

When managing large address spaces, an amount of metadata in the management layer may become an issue. The smaller the grain size is, the more metadata may be required to represent the address space.

Now consider an address space with a grain size of 8 KB, meaning reads and writes to the address space may be a multiple of 8 KB. It would be straightforward to have a metadata entry per 8 KB grain. However, further consider that an alignment of the address space may be 4 KB, so that writes may or may not be aligned to 8 KB. It may no longer be possible to have a metadata entry per 8 KB because writes at 4 KB alignment may create entries of 4 KB. This may be considered an address space of unequal granularity and alignment.

It is important to note that the 8 KB size granularity and 4 KB alignment granularity are used solely for purposes of example, and are not to be construed as limiting in any way. The described implementation may be applied to any size granularity that is two times the alignment granularity, and may be extended to other ratios as well.

One solution may hold an entry in the metadata structure for each 4 KB of address space. However, this may cost twice the amount of metadata in relation to an entry per 8 KB of address space. This metadata may be stored in an array, thereby providing efficient memory utilization and superior performance due to direct access.

Assuming it is possible to combine two adjacent entries of 4 KB into a single entry of 8 KB, an implementation is provided for storing the address space in a metadata structure using 50% less metadata than the aforementioned 4 KB solution requires, while retaining the robust performance of direct access.

Summary

Figure 5:
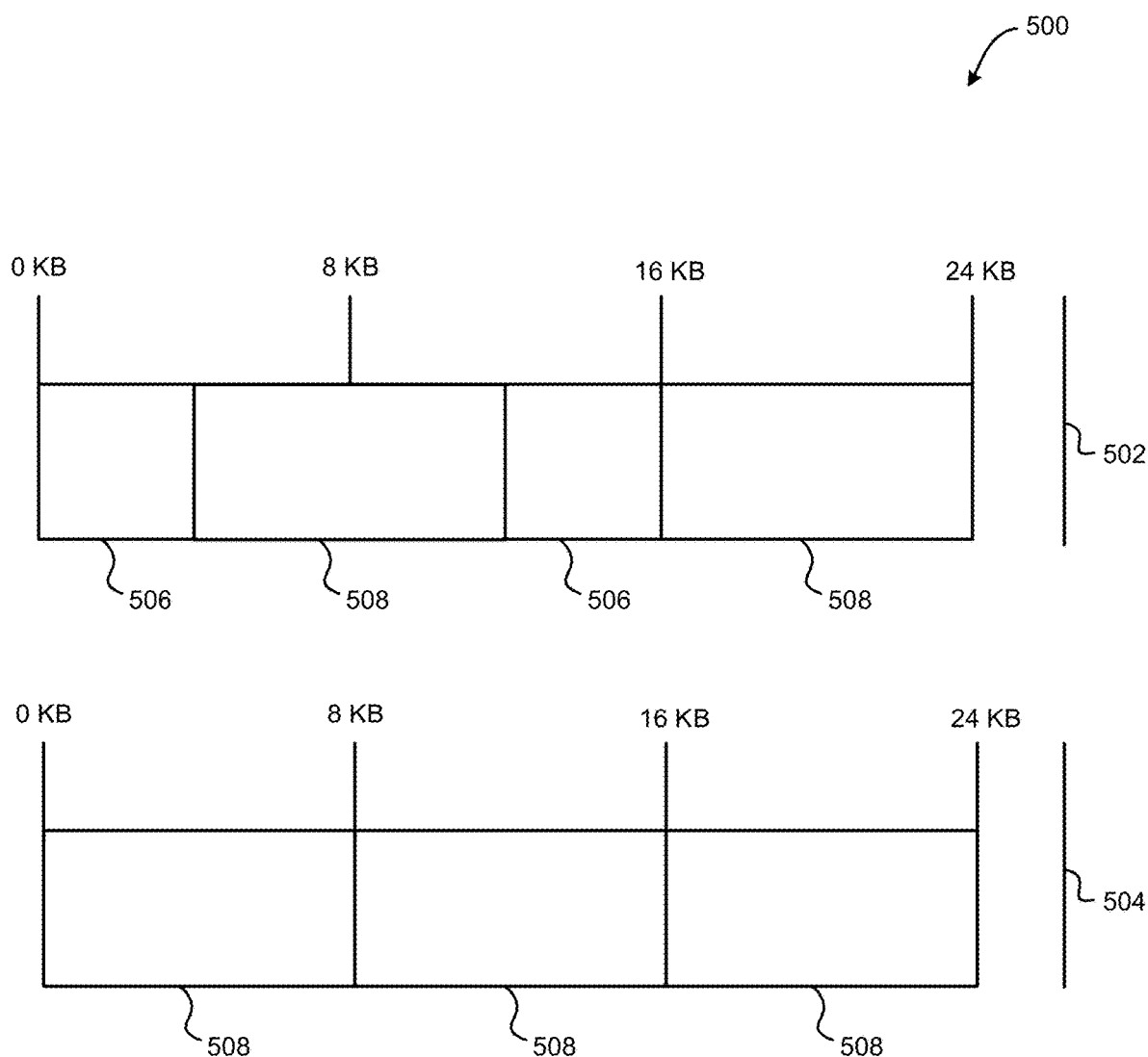
FIG. 5 illustrates a first scenario illustrating interleaved 4 KB entries and 8 KB entries, as well as a second scenario illustrating non-interleaved 8 KB entries, in accordance with one embodiment.

In one embodiment, the implementation may be based on the fact that it is possible to merge two neighboring entries of 4 KB (8 KB entries may not be touched). This makes it clear that the case that requires the highest number of entry modifications within the metadata structure is when 4 KB and 8 KB entries are interleaved. FIG. 5 illustrates a first scenario 502 illustrating interleaved 4 KB entries 506 and 8 KB entries 508, as well as a second scenario 504 illustrating non-interleaved 8 KB entries 508.

One solution may be to use a dynamic sized structure since the number of entries is dynamic. However, this may reduce a performance of the management layer of the system. For example, dynamic allocations may be required, and access may not be direct. These issues may be overcome by utilizing a metadata structure that has a predefined size, provides direct access, and uses less memory than a 4 KB solution.

In one embodiment, the current implementation may average 2 entries per 12 KB. The size of each entry may be either 4 KB or 8 KB. Entries may also be left unused. Additionally, an entry may be either aligned to 4 Kb or to 8 KB. This may require two state bits per entry that represent the following states of an entry:

8 KB aligned left
4 KB aligned left or right
8 KB or 4 KB aligned right
Unused

In one embodiment, the left alignment may include the lower address the entry may contain, and the right alignment may include the higher address the entry may contain. In this example, the right alignment may always be 4 KB more than the left alignment. States 2 and 3 may differ between even and odd entries.

In one embodiment, a direct outcome of the above is that an address may have only two possible entries it can be placed in. This may provide performance equivalent to an array. It will also be shown how neighboring entries interact and how the entries can be stored in self-contained pages.

Description

In one embodiment, the term pos may include a position of a read/write within the address space, where the position corresponds to a n alignment granularity of the address space. For example, if the alignment granularity is 4 KB, pos may be the 4 KB aligned position of a read/write within the address space. This term will be used in formulas below.

Writing to an Address Space

When writing to the address space, the index number of an entry within the metadata structure to use to represent pos may be found using the following formula:

Entry index=rounddown((pos+2 KB)/6 KB).

Once the target entry is determined by the above formula, the state of the neighboring metadata structure entries may be checked because a write to pos might overwrite content of an adjacent entry within the metadata structure. Furthermore, the write to pos might lead to two consecutive 4 KB entries that may be merged.

Figure 6:
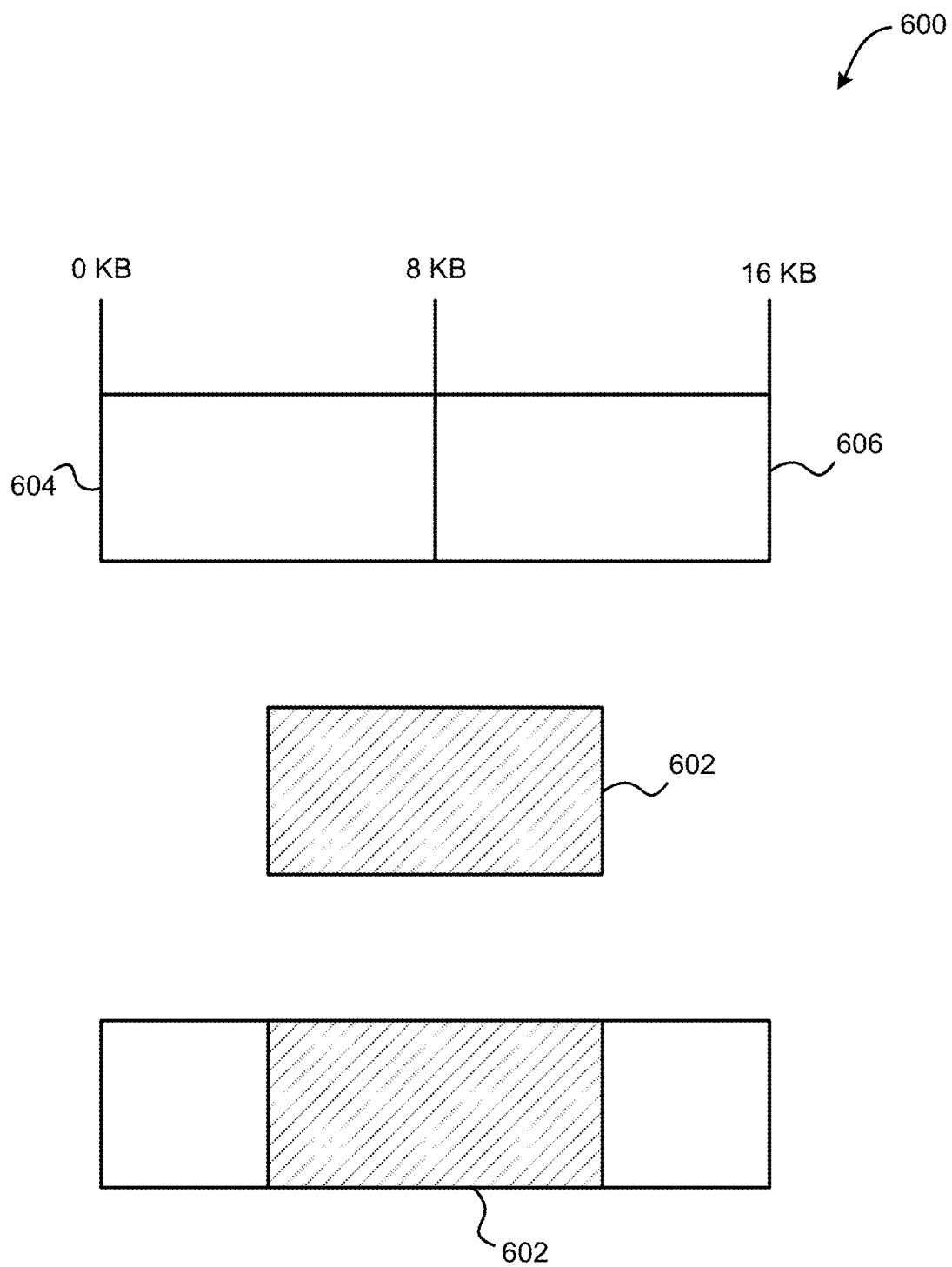
FIG. 6 illustrates an exemplary address space where an 8 KB write to a position of 4 KB within the address space leads to an overwrite of two existing entries, in accordance with one embodiment.

FIG. 6 illustrates an exemplary address space 600 where an 8 KB write 602 to a position of 4 KB within the address space 600 leads to an overwrite of two existing entries representing locations 604 (from 0 KB to 8 KB) and 606 (from 8 KB to 16 KB) within the address space 600.

Figure 7:
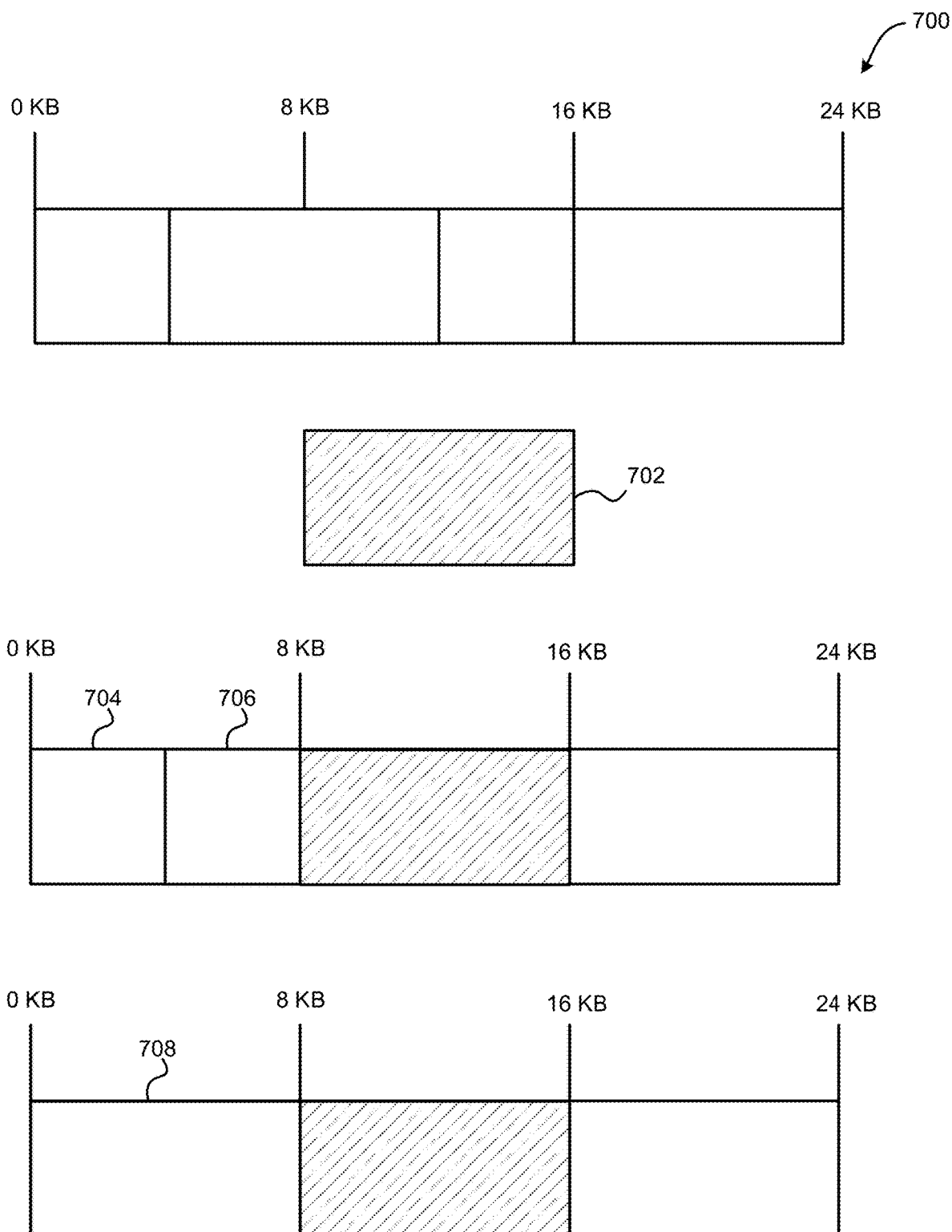
FIG. 7 illustrates an exemplary address space where an 8 KB write to a position of 8 KB within the address space leads to a merge, in accordance with one embodiment.

FIG. 7 illustrates an exemplary address space 700 where an 8 KB write 702 to a position of 8 KB within the address space 700 leads to a merge of two entries representing a first location 704 (from 0 KB to 4 KB) and a second location 706 (from 4 KB to 8 KB) within the address space 700, to create a merged entry 708 (from 0 KB to 8 KB). It should be noted that the two entries representing the first location 704 (from 0 KB to 4 KB) and the second location 706 (from 4 KB to 8 KB) within the address space 700 prior to the creation of the merged entry 708 (from 0 KB to 8 KB) are included within an intermediate state, and are shown for purposes of example only.

In one embodiment, a cost of a write to the address space may be determined by an alignment of the write compared to the alignment of the data previously written within the address space. For example, the cost of a write may include a modification of one entry, if the existing alignment is retained. In another example, the cost of the write may include a modification of two entries (see, for Example, FIG. 6). In yet another example, the cost of the write may include a modification of three entries (see, for Example, FIG. 7). If a merge is required on both ends within the address space, up to four entries may be modified.

Figure 8:
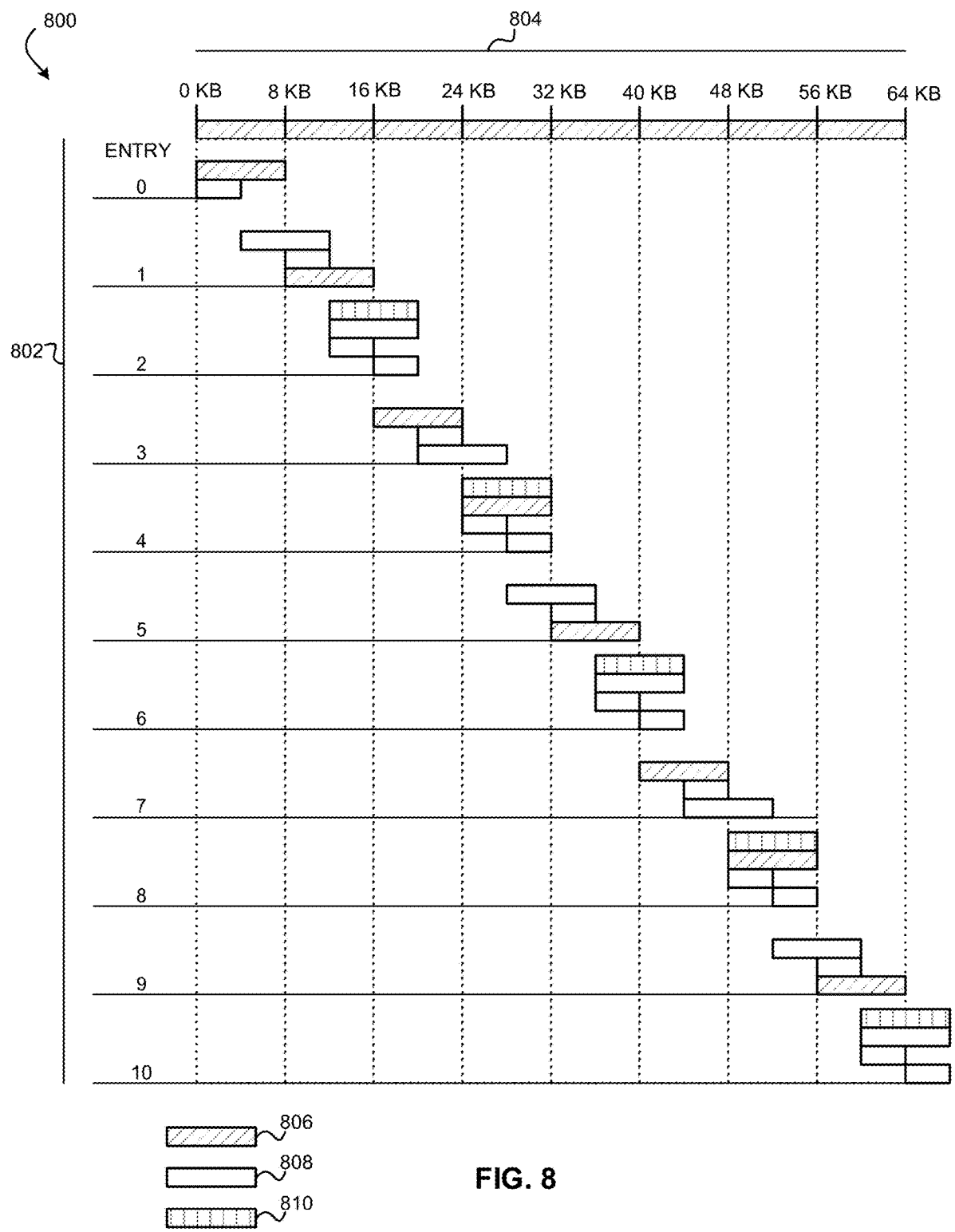
FIG. 8 illustrates an exemplary chart including a list of entries within a metadata structure that correspond to a consistent alignment within a corresponding address space, in accordance with one embodiment.

FIG. 8 illustrates an exemplary chart 800 including a list of entries 802 within a metadata structure that correspond to a consistent alignment 804 within a corresponding address space. In one embodiment, the consistent alignment 804 may be created utilizing writes that are aligned with a size granularity of the address space. The actual content 806 stored within the entries 802 is included, along with possible content 808 (e.g., content that could possibly be stored within the entries 802) and empty space 810 (e.g., locations within the entries 802 where no content is stored).

Figure 9:
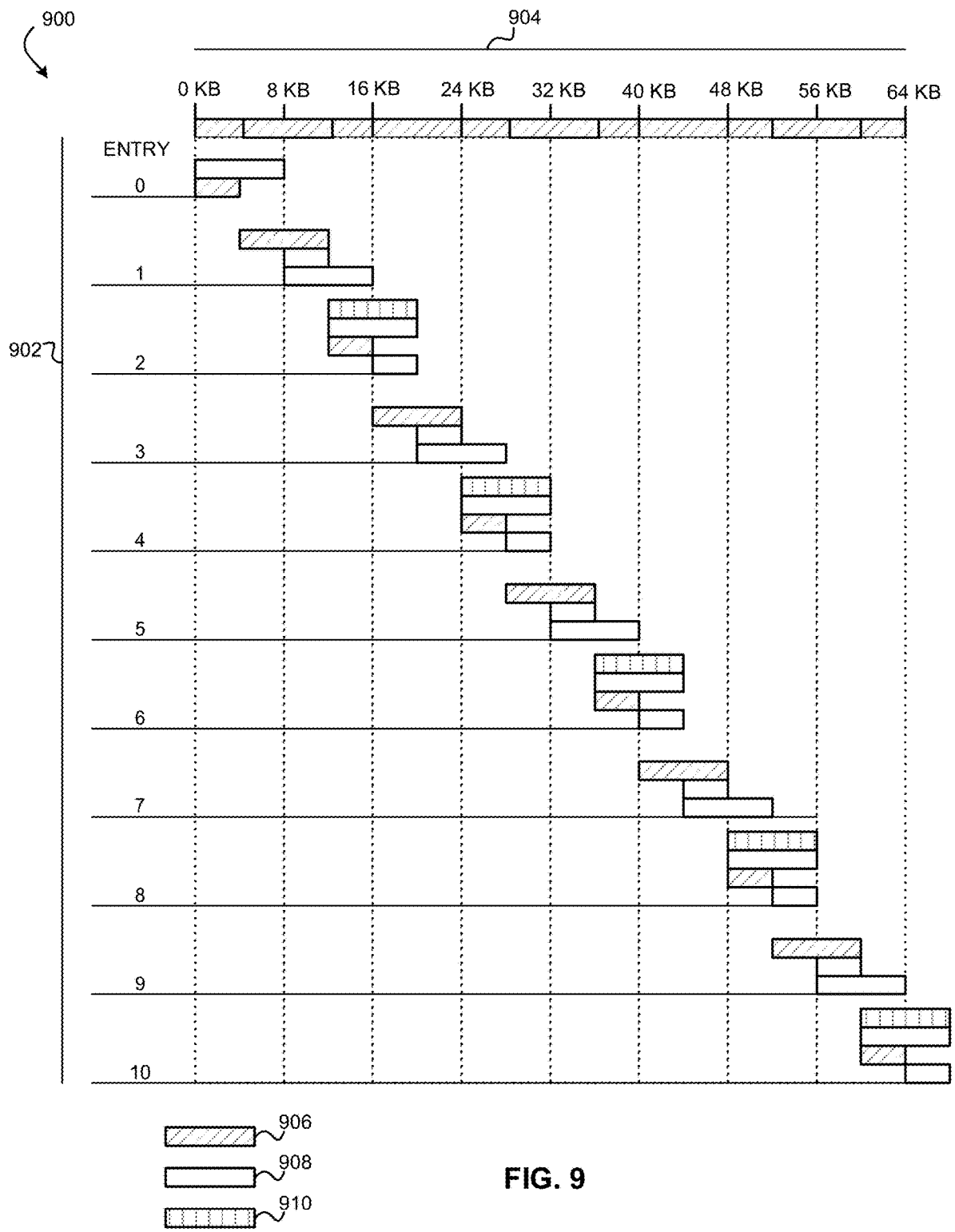
FIG. 9 illustrates an exemplary chart of entries within a metadata structure that correspond to a varying alignment within a corresponding address space, in accordance with one embodiment.

FIG. 9 illustrates an exemplary chart 900 of entries 902 within a metadata structure that correspond to a varying alignment 904 within a corresponding address space. In one embodiment, the varying alignment 904 may be created utilizing writes that meet an alignment granularity of the address space, but are not aligned with a size granularity of the address space. The actual content 906 stored within the entries 902 is included, along with possible content 908 (e.g., content that could possibly be stored within the entries 902) and empty space 910 (e.g., locations within the entries 902 where no content is stored).

FIGS. 8 and 9 detail what each entry can contain and demonstrate how writes at different alignments are stored in the structure. This illustrates how a static metadata structure may implement dynamic behavior and adjust for both a consistent alignment 804 as shown in FIG. 8 and a varying alignment 904 as shown in FIG. 9.

As shown in FIGS. 8 and 9, the potential content may differ between even and odd entry indices within the metadata structures. For example, entries with an even index may have four possible states, whereas entries with an odd index may have three possible states. Table 1 illustrates exemplary states of entries within a metadata structure, in accordance with one embodiment. Of course, it should be noted that the exemplary states shown in Table 1 are set forth for illustrative purposes only, and thus should not be construed as limiting in any manner.

TABLE 1

| State | Even entry index | Odd entry index |
|-------|------------------|-----------------|
| 1 | 8 KB aligned left | 8 KB aligned left |
| 2 | 4 KB aligned left | 4 KB aligned right |
| 3 | 4 KB aligned right | 8 KB aligned right |
| 4 | Entry is unused | — |

In one embodiment, a state of the entry, including its size and alignment within the address space, may be described utilizing a predetermined portion of the entry within the metadata structure (e.g., two bits, etc.). This predetermined portion may be analyzed in association with the entry number (even or odd) to determine the size and alignment of the entry within the address space.

Table 2 illustrates the possible alignments for an entry with an index i within a metadata structure, in accordance with one embodiment. Of course, it should be noted that the possible alignments shown in Table 2 are set forth for illustrative purposes only, and thus should not be construed as limiting in any manner.

TABLE 2

| For an entry with an index i, the two possible alignments in may contain are: | | |
|---|---|---|
| Alignment | i is even | i is odd |
| Left | pos = 6 * i<br>len = 4 or 8 | pos = 6 * i − 2<br>len = 8 |
| Right | pos = 6 * i + 4<br>len = 4 | pos = 6 * i + 2<br>len = 4 or 8 |

Reading from an Address Space

In one embodiment, an entry may be determined for a read that is aligned to a predetermined granularity (in this exemplary case, 4 KB). In another embodiment, a single position may be located in one of two entries. For example, when reading from pos=4 KB, the entry may be in entry 0 as the end of an 8 KB write to pos=0 KB, or it may be in entry 1 as the result of a write to pos=4.

The two cell indices of a position pos may be calculated as follows:

Entry 1=(pos−2 KB)/6 KB

Entry 2=(pos+2 KB)/6 KB.

Subdividing the Metadata into Self-Contained Groups

In one embodiment, it may be possible to divide the metadata into self-contained groups. A self-contained group may not have a carryover into its first entry from a previous group, and it may not have a carryover from its last entry into a following group. This may provide efficient paging of the metadata within the metadata structure. These groups may also allow for two consecutive 4 KB chunks, where one is the last of a first group and the second is the first of a following group (assuming an alignment granularity of 4 KB).

The amount of address space covered by a group may be calculated as follows:

coverage=6 KB*$n$ rounded down to nearest 4 KB, where n is the number of entries in the group.

In this way, an amount of space needed by the metadata structure to represent the address space may be reduced. For example, assuming a size granularity of 8 KB and an alignment granularity of 4 KB, the metadata structure may only require two entries per 12 KB of address space (e.g., instead three per 12 KB of address space, as required when using a metadata structure having entries corresponding to an alignment granularity of the address space).

Additionally, the size of the metadata structure may be static, as well as the number of entries within the metadata structure, and therefore no allocations may be required. Further, finding an entry within the metadata structure that contains any address within the address space may be direct (e.g., in the 4 KB alignment granularity example, the entry may be found in up to two entries).

Further still, determining the entry within the metadata structure to write any position to is done utilizing a simple and inexpensive formula. Also, there may be no cache miss when looking at the second entry. In addition, no merge penalty may exist if an alignment is consistent. Furthermore, 8 KB chunks may not be affected—this may be important if, for example, the address space undergoes deduplication that typically takes place at 8 KB. Further still, the metadata structure may simply and efficiently be divided into pages. Also, the cost may be only two bits per entry for state, and a merge penalty may exist only if an alignment keeps changing.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
identifying a data write to a specific position within a virtual address space;
determining an entry within a metadata structure that corresponds to the specific position within the virtual address space; and
adding state information associated with the data write to the entry within the metadata structure, the state information including a size of the data write within the virtual address space and an alignment of the data write within the virtual address space, the alignment including a left alignment or a right alignment.

2. The computer-implemented method of claim 1, wherein the virtual address space has an alignment granularity and a size granularity, where the size granularity is different from the alignment granularity.

3. The computer-implemented method of claim 1, wherein the metadata structure represents the virtual address space at a management layer of a system.

4. The computer-implemented method of claim 1, wherein the metadata structure includes an array.

5. The computer-implemented method of claim 1, wherein the metadata structure includes a plurality of entries, where one or more entries within the metadata structure each correspond to a position within the virtual address space where data is stored, and each entry within the metadata structure corresponds to a portion of the virtual address space having a size matching a size granularity of the virtual address space.

6. The computer-implemented method of claim 1, wherein each entry within the metadata structure includes an indication as to whether a corresponding grain is in use, and a physical address of the corresponding grain.

7. The computer-implemented method of claim 1, wherein the state information is added as two bits within the entry in the metadata structure, where the two bits indicate a size of the entry, and whether the entry is aligned left or right within a portion of virtual address space represented by the entry within the metadata structure.

8. The computer-implemented method of claim 1, wherein the size and the alignment of the data write are associated with a numbering of the entry.

9. The computer-implemented method of claim 1, further comprising adjusting one or more additional entries within the metadata structure, based on the data write.

10. The computer-implemented method of claim 1, wherein the metadata structure is subdivided into a plurality of self-contained groups, where each self-contained group within the plurality of self-contained groups does not have any entry carryover into adjacent groups.

11. A computer program product for representing an address space of unequal granularity and alignment, the computer program product comprising a computer readable storage medium having program instructions embodied therewith, wherein the computer readable storage medium is not a transitory signal per se, the program instructions executable by a processor to cause the processor to perform a method comprising:
identifying a data write to a specific position within a virtual address space, utilizing the processor;
determining an entry within a metadata structure that corresponds to the specific position within the virtual address space, utilizing the processor; and adding, utilizing the processor, state information associated with the data write to the entry within the metadata structure, the state information including a size of the data write within the virtual address space and an alignment of the data write within the virtual address space, the alignment including a left alignment or a right alignment.

12. The computer program product of claim 11, wherein the virtual address space has an alignment granularity and a size granularity, where the size granularity is different from the alignment granularity.

13. The computer program product of claim 11, wherein the metadata structure represents the virtual address space at a management layer of a system.

14. The computer program product of claim 11, wherein the metadata structure includes an array.

15. The computer program product of claim 11, wherein the metadata structure includes a plurality of entries, where one or more entries within the metadata structure each correspond to a position within the virtual address space where data is stored, and each entry within the metadata structure corresponds to a portion of the virtual address space having a size matching a size granularity of the virtual address space.

16. The computer program product of claim 11, wherein each entry within the metadata structure includes an indication as to whether a corresponding grain is in use, and a physical address of the corresponding grain.

17. The computer program product of claim 11, wherein the state information is added as two bits within the entry in the metadata structure, where the two bits indicate a size of the entry, and whether the entry is aligned left or right within a portion of virtual address space represented by the entry within the metadata structure.

18. The computer program product of claim 11, wherein the size and the alignment of the data write are associated with a numbering of the entry.

19. A system, comprising:
a processor; and
logic integrated with the processor, executable by the processor, or integrated with and executable by the processor, the logic being configured to:
identify a data write to a specific position within a virtual address space;
determine an entry within a metadata structure that corresponds to the specific position within the virtual address space; and
add state information associated with the data write to the entry within the metadata structure, the state information including a size of the data write within the virtual address space and an alignment of the data write within the virtual address space, the alignment including a left alignment or a right alignment.

* * * * *